(12) United States Patent
Stark et al.

(10) Patent No.: US 11,913,192 B2
(45) Date of Patent: Feb. 27, 2024

(54) METHOD FOR TIPPING OUT A CARGO LOAD

(71) Applicant: DEERE & COMPANY, Moline, IL (US)

(72) Inventors: Sebastian Stark, Weinheim (DE); Frederic Ballaire, Neustadt (DE); Patrick Bechtold, Frankenthal (DE)

(73) Assignee: DEERE & COMPANY, Moline, IL (US)

( * ) Notice: Subject to any disclaimer, the term of this patent is extended or adjusted under 35 U.S.C. 154(b) by 796 days.

(21) Appl. No.: 16/580,798

(22) Filed: Sep. 24, 2019

(65) Prior Publication Data

US 2020/0095749 A1    Mar. 26, 2020

(30) Foreign Application Priority Data

Sep. 25, 2018   (DE) .......................... 102018216369.3

(51) Int. Cl.
| | | |
|---|---|---|
| *A01K 1/10* | (2006.01) | |
| *E02F 9/20* | (2006.01) | |
| *E02F 3/28* | (2006.01) | |
| *E02F 9/26* | (2006.01) | |

(52) U.S. Cl.
CPC .............. *E02F 9/2029* (2013.01); *E02F 3/28* (2013.01); *E02F 9/26* (2013.01)

(58) Field of Classification Search
CPC ...... G01G 19/083; G01G 19/10; G01G 19/08; G01G 19/14; G01G 19/387; G01G 19/12; A01K 5/0258; A01K 1/10; E02F 9/26; E02F 9/264; E02F 3/434; E02F 3/283; E02F 9/2025; E02F 9/0841; E02F 3/64; E02F 3/431; E02F 9/2029; E02F 3/28; G06F 3/0482; G06F 9/542; G06F 7/00; G06F 19/00; G06F 7/70; G06K 9/6215; G06K 9/6288; G06Q 50/02; G05D 1/02; G06G 7/00; G06G 7/76
See application file for complete search history.

(56) References Cited

U.S. PATENT DOCUMENTS

| | | | | |
|---|---|---|---|---|
| 3,677,427 A | * | 7/1972 | Allen ................... | E02F 9/0841 |
| | | | | 414/697 |
| 4,321,212 A | * | 3/1982 | Suzuki ................. | C07C 255/00 |
| | | | | 558/398 |

(Continued)

FOREIGN PATENT DOCUMENTS

DE    102013203826 A1    9/2014

OTHER PUBLICATIONS

European Search Repod issued in counterpad European Patent Application No. 19197429.4 dated Feb. 12, 2020 (7 pages).

(Continued)

*Primary Examiner* — Edwin J Toledo-Duran

(57) ABSTRACT

A method for tipping out a cargo load from a reception unit includes providing the reception unit on a lifting device of a work machine, performing a tipping out process of a mass of cargo load from the reception unit, detecting a predetermined residual mass of the cargo load remaining in the reception unit, detecting a predetermined loading mass tipped out during the tipping step, and completing the tipping out process as a function of the predetermined residual mass or the predetermined loading mass.

8 Claims, 4 Drawing Sheets

(56) References Cited

U.S. PATENT DOCUMENTS

| | | | | |
|---|---|---|---|---|
| 4,726,616 | A * | 2/1988 | Schmidt | B65F 1/122 294/68.2 |
| 5,235,809 | A * | 8/1993 | Farrell | E02F 9/221 60/494 |
| 5,321,212 | A * | 6/1994 | Wadell | G01G 19/393 177/25.18 |
| 6,018,128 | A * | 1/2000 | Asai | G01G 19/393 177/4 |
| 6,157,889 | A * | 12/2000 | Baker | G01G 19/12 701/124 |
| 6,211,471 | B1 * | 4/2001 | Rocke | G01G 19/083 177/136 |
| 8,954,243 | B2 | 2/2015 | Harshberger | G01G 19/10 701/1 |
| 10,900,824 | B2 * | 1/2021 | Godsey | E02F 9/26 |
| 11,142,413 | B2 * | 10/2021 | Hoofard | G05D 1/0229 |
| 11,174,618 | B2 * | 11/2021 | Currier | E02F 3/434 |
| 11,208,125 | B2 * | 12/2021 | Thiyagarajan | B61L 27/14 |
| 11,319,695 | B2 * | 5/2022 | Yamamoto | E02F 9/262 |
| 11,404,762 | B2 * | 8/2022 | Ryden | H01Q 1/185 |
| 2005/0145419 | A1 * | 7/2005 | Deters | G01G 13/18 222/77 |
| 2008/0017645 | A1 * | 1/2008 | Garagiola | B65F 1/122 220/345.4 |
| 2009/0126473 | A1 * | 5/2009 | Porat | G01F 23/00 340/815.4 |
| 2011/0166696 | A1 | 7/2011 | Nignon | |
| 2014/0291038 | A1 * | 10/2014 | Hague | E02F 3/431 177/1 |
| 2014/0336874 | A1 | 11/2014 | Harshberger, II et al. | |
| 2016/0047689 | A1 | 2/2016 | Stanley et al. | |
| 2017/0113591 | A1 * | 4/2017 | Spielman, Jr. | E02F 9/265 |
| 2018/0364091 | A1 * | 12/2018 | Godsey | G06F 3/0482 |

OTHER PUBLICATIONS

European Search Report issued in European patent application No. 19197267.8, dated Feb. 24, 2020, 7 pages.

Frederic Ballaire, Dynamic, Continuous, and Center of Gravity Independent Weighing with a Loader, Technical University of Kaiserslautern, Oct. 17, 2014, 188 pages.

Altair EDEM, Discrete Element Modeling (DEM) Software, <URL: https://www.altair.com/edem/>, accessed Mar. 29, 2023, 16 pages.

Mathworks, Choose a Solver, <URL: https://www.mathworks.com/help/simulink/ug/choose-a-solver.html>, 3 pages.

Mathworks, Simscape Multibody Link, <URL: https://www.mathworks.com/help/smlink/index.html>, 2 pages.

Heinrich Hertz, Über die Berührung fester elastischer Körper, Journal für die reine und angewandte Mathematik, Berlin, 1881, pp. 156-171.

Matthias Fritz, Andreas Wolfschluckner, and Dirk Jodin, Simulation von Paketen im Pulk, Logistics Journal - ISSN 1860-5923, Graz, 2013, pp. 1-8.

P. A. Cundall and O. D. L. Strack, A discrete numerical model for granular assemblies, Géotechnique 29, No. 1, 47-65, 1979, pp. 47-65.

Wolfgang Eisenberg and Uwe Renner, Zur Beschreibung grobgranularer Schüttgüter mit zellulären Automaten, Arnold-Sommerfeld-Gesellschaft e.V., Leipzig, 2004, pp. 247-252.

Jürgen Roßmann, Michael Schluse, Thomas Josef Jung, and Malte Rast, Interaktive integrierte Starrkörperdynamik- und Schüttgutsimulation, Institut für Mensch-Maschine-Interaktion, RWTH Aachen, Aachen, 2009, pp. 31-48.

K. L. Johnson, K. Kendall, and A. D. Roberts, Surface Energy and the Contact of Elastic Solids, Proceedings of the Royal Society of London, Series A, Mathematical and Physical Sciences, Berlin, 1971, pp. 301-313.

Dawei Zhao, Erfan G. Nezami, Youssef M.A. Hashash, and Jamshid Ghaboussi, Three-dimensional discrete element simulation for granular materials, Engineering Computations 23(7): 749-770, Illinois, USA, 2006, pp. 749-770.

D. Schulze, Pulver und Schüttgüter, Springer Verlag, ISBN: 978-3-540-88448-4, 2009, 1051 pages.

Matthias Börner, Einführung in die Diskrete Elemente Methode, NaWiTec, Institut für Verfahrenstechnik, Otto-von-Guericke Universität Magdeburg, Magdeburg, 2011, 75 pages.

D. Schulze, Pulver und Schüttgüter, Springer Verlag, ISBN: 978-3-540-88448-4, 2009, 30 pages.

Heinrich Hertz, Über die Berührung fester elastischer Körper, Journal für die reine und angewandte Mathematik, Berlin, 1881, 32 pages.

Alexander Schinner, Ein Simulationssystem für granulare Aufschüttungen aus Teilchen variabler Form, Otto-von-Guericke-Universität Magdeburg, 2000, 359 pages.

Matthias Fritz, Andreas Wolfschluckner, and Dirk Jodin, Simulation von Paketen im Pulk, Logistics Journal—ISSN 1860-5923, Graz, 2013, 16 pages.

Wolfgang Eisenberg and Uwe Renner, Zur Beschreibung grobgranularer Schüttgüter mit zellulären Automaten, Arnold-Sommerfeld-Gesellschaft e.V., Leipzig, 2004, 12 pages.

Jürgen Roßmann, Michael Schluse, Thomas Josef Jung, and Malte Rast, Interaktive integrierte Starrkörperdynamik- und Schüttgutsimulation, Institut für Mensch-Maschine-Interaktion, RWTH Aachen, Aachen, 2009, 36 pages.

* cited by examiner

METHOD FOR TIPPING OUT A CARGO LOAD

RELATED APPLICATIONS

This application claims priority to German Patent Application Ser. No. 102018216369.3, filed Sep. 25, 2018, the disclosure of which is hereby incorporated by reference in its entirety.

FIELD OF THE DISCLOSURE

The present disclosure relates to a method for tipping out a cargo load from a reception unit arranged on a lifting device of a work machine.

BACKGROUND

German Patent No. DE 102013203826A1 discloses a work machine having a lifting device for lifting and lowering a cargo load. In this case, the mass of the cargo load can be determined continuously using a weighing device by means of a sensor unit.

There is a need, however, to further improve the functionality of the lifting device.

SUMMARY

In the present disclosure, a cargo load (for example, a bulk material) is emptied out, in particular tipped out, from a reception unit (for example, a scoop). The reception unit is arranged on a lifting device (for example, a front loader) of a work machine. The method may comprise a plurality of tipping-out processes in succession, or a single tipping-out process. During a tipping-out process, the cargo load may be tipped out either fully or only partially from the reception unit. In order to assist partial tipping out of the cargo load from the reception unit with high accuracy, the tipping-out process is ended as a function of detection of at least one of the following variables:

a predetermined residual mass m_re of the cargo load still contained in the reception unit, a predetermined loading mass Δm_zul tipped out during this tipping-out process.

By means of suitable technical means (for example, a suitable weighing device on the work machine), it is possible to detect mathematically and technically simply whether and when the predetermined residual mass m_re is reached or the predetermined loading mass m_zul is reached i.e., has been tipped out. In this way, the method offers an automatic tipping-out or unloading function, with the aid of which a predetermined target total mass m_sum_ziel can be achieved automatically and with high accuracy at a work or loading site. The method therefore offers an advantageous assistance function for loading work of the work machine. The workload of the driver of the work machine is significantly reduced during the working process.

The method allows a tipping-out process in which the cargo load is intended to be tipped out only portionally, i.e. partially, from the reception unit.

The method assists, in particular, loading work during which a plurality of conventional tipping-out processes are carried out in succession, in each case with full tipping out of the cargo load from the reception unit, and the final tipping-out process requires only partial tipping out of the cargo load in order to achieve the predetermined target total mass m_sum_ziel as exactly as possible at the work or loading site. In the same way, the method may advantageously be used for loading work, or loading activity, which requires a single tipping-out process with only portional tipping out of the cargo load from the reception unit.

The direct or indirect detection of the predetermined residual mass m_re also comprises the possibility that this mass m_re is detected with a certain inaccuracy in relation to the actual mass of the cargo load still contained in the reception unit. This inaccuracy corresponds to a tolerance range which takes into account various influencing quantities, for example, properties of the sensor unit of a weighing device for determining a mass of the cargo load, size of the loading mass m_zul to be tipped out, and properties of the cargo load. Similar considerations apply for direct or indirect detection of the predetermined loading mass m_zul considered to have been tipped out, in relation to a mass actually tipped out.

The reception unit may be any container for receiving a cargo load. The reception unit is fixed in a suitable way rigidly or movably on the lifting device. For example, the reception unit as a scoop is arranged articulatedly on the lifting device. In another case, the reception unit is configured as a loading fork, or the reception unit is arranged immovably on a loading fork. In another embodiment, the reception unit is configured in a claw-like fashion (for example, as a gripping claw).

The cargo load may be any desired bulk material and have different aggregate states. For example, the cargo load is a liquid, seeds, animal feed, soil, sand, or a stone mixture such as gravel, grit and the like.

The cargo load is tipped out at a work or loading site (for example, on a trailer or a loading bay). A mass of the cargo load contained in the reception unit is determined immediately before the tipping-out process in question or during the tipping-out process in question.

The mass of the cargo in the reception unit is determined, in particular, by a suitable weighing device on the work machine. In this case, for example, the method known from DE 10 2013 203 826 A1 for weighing a cargo load is used.

The mass of the cargo load in the reception unit, present and determined immediately before the start of the tipping-out process may be referred to as an initial mass m_st. It corresponds to a current mass m_akt of the cargo load in the reception unit immediately before the start of the tipping-out process. During the tipping-out process, the current mass m_akt of the cargo load contained in the reception unit is determined once or repeatedly, for example, continuously or at determined time intervals. The driver of the work machine, a user or an electronic control system of the work machine may be informed regularly about the current mass m_akt.

The determination of the initial mass m_st or of the current mass m_akt makes it possible to detect mathematically and technically simply whether and when the predetermined residual mass m_re is reached or the predetermined loading mass m_zul is reached.

The determined initial mass m_st may be compared with the predetermined loading mass m_zul. This comparison offers a measure which is simple in terms of control technology for establishing whether the cargo load contained in the reception unit immediately before a tipping-out process should be tipped out fully or only partially. If it is established that m_st<m_zul, the cargo load may be tipped out fully and the tipping-out process is ended. In this case, detection of the residual mass m_re or of the tipped-out loading mass m_zul is not absolutely necessary in order to initiate termination of the tipping-out process.

The residual mass m_re may be predetermined in a way which is simple in terms of method technology if the initial mass m_st of the cargo load contained in the reception unit before the tipping-out process is known. This initial mass m_st corresponds to the current mass m_akt of the cargo load immediately before or at the start of the tipping-out process, and may therefore be determined in a technically simple way with the same technical means (for example, a weighing device) as those with which the current mass m_akt is determined during the tipping-out process.

Furthermore, the residual mass m_re is predetermined as a function of the predetermined loading mass m_zul. For example, the residual mass m_re may be predetermined relatively exactly by the equation m_re=m_st−m_zul.

In one embodiment, the current mass m_akt of the cargo load contained in the reception unit is compared with the predetermined residual mass m_re before the tipping-out process is ended. This comparison, or the comparison result, offers a criterion which is simple in terms of control technology in order, during the tipping-out process, to initiate its termination at the optimal time. In order to assist the accuracy of the method procedure, the current mass m_akt is determined at defined or constant time intervals and then respectively compared with the predetermined residual mass m_re.

In another embodiment, the lifting device comprises a boom which is mounted tiltably about a first tilt axis relative to the work machine. The reception unit is in this case mounted tiltably about a second tilt axis relative to the boom. In this case, the current mass m_akt may be determined during the tipping-out process or at the start of the tipping-out process (initial mass m_st) with technically simple auxiliary means, for example, by using standardly available sensor means and suitable algorithms. The determination, or calculation, of the mass is in this case carried out in particular as a function of at least one of the following quantities: a mass of the boom, a mass of the reception unit, a torque about the first tilt axis, a torque about the second tilt axis, a centroid of the mass of the boom with respect to the first tilt axis, a centroid of the mass of the reception unit with respect to the second tilt axis. The aforementioned torques are in turn determined by taking into account actuator forces (in particular cylinder forces) on the boom. These forces may, for example, be determined using pressure sensors.

During the tipping-out process, a tipping angle w_k of the reception unit relative to a reference straight line (for example, vertical or horizontal of the work machine or the ground) in a tipping-out direction is modified. In this way, by a controlled, varying tipping angle w_k, the accuracy in the partial tipping out of the cargo load from the reception unit can be improved further.

In order to assist an efficient tipping-out process with high accuracy, the determination of the current mass m_akt or the modification of the tipping angle w_k is carried out respectively after defined time intervals have elapsed. By a corresponding modification of the time interval, the accuracy of the tipping-out process may be adapted to the requirements of the respective loading activity. This continuous determination and adjustment of current values allows a high accuracy of the tipping-out process even in the case of cargo loads with complex properties (for example, tacky bulk materials, bulk material comprising a plurality of mixed materials).

In another embodiment, the reaching of the predetermined residual mass m_re or of the predetermined loading mass m_zul is detected indirectly as a function of a setpoint value w_soll. During the tipping-out process, the reception unit than merely needs to be adjusted in respect of its tipping angle w_k to the value w_k=w_soll. This reduces the length of time of the tipping-out process itself, and assists a time-efficient method procedure.

In order to keep the method procedure technically simple and application-friendly when using a setpoint value w_soll of the tipping angle w_k, the setpoint value w_soll is derived and established with the aid of provided calibration data.

In order to be able to use the calibration data particularly simply in terms of method technology, they represent a ratio between a mass of the cargo load and a tipping angle of the reception unit relative to a reference straight line. In this case, in particular, the current mass m_akt of the cargo load in the reception unit is recorded at different tipping angles w_k and stored as calibration data. During an operation, this allows simple conversion calculation of a desired residual mass m_re or loading mass m_zul to a setpoint value of the tipping angle w_k.

The calibration data may be stored as a calibration diagram (for example, table or curve). For specific materials as a cargo load, or bulk material, specific calibration data are respectively compiled. Apart from the specific nature of cargo load, other features may also be taken into account in the calibration data, for example, particle geometries, temperature, moisture content of the cargo load, a holding time of the tipping angle w_k=w_soll.

The calibration may be carried out chronologically independently of the immediately pending loading activity, and the calibration data may be called upon demand—for example, from a corresponding material database. As an alternative, calibration data may be compiled and stored in a calibration process immediately before the planned loading activity with the cargo load to be tipped out. In this way, characteristic features of the cargo load may be taken into account in the calibration data in an up-to-date and exact fashion.

The calibration comprises recording of a plurality of value pairs. Intermediate values may optionally be generated by interpolation. In this way, the current mass m_akt of the cargo load in the reception unit may be represented as a function of the tipping angle w_k of the reception unit.

During the tipping-out process, at least one shaking process is carried out. The effect achieved by this is that the cargo load can be released reliably from the reception unit even in the case of tacky properties. This in turn assists the reaching of the predetermined residual mass m_re in the reception unit with high accuracy and a short method duration. During each shaking process, the reception unit is tipped at least once counter to the tipping-out direction and then in the tipping-out direction. The tipping angles w_k executed in this case may be predetermined for the respective shaking process or adjusted individually.

At the end or during the ending of the tipping-out process, the reception unit is tipped counter to the tipping-out direction. This ensures that, in the event of a detected residual mass m_re in the reception unit, no further portion of the cargo load is actually tipped out.

During the tipping-out process, it is advantageous to signal relevant information relating to the loading process to the user or vehicle driver, in order to reduce their workload during the loading process. The signaling is carried out by a suitable electronic unit, for example, a display for reading or entering data. In this case, individual data may be predetermined by a control unit or by the user, or vehicle driver. This relates, for example, to a target total mass m_sum_ziel of the cargo load to be tipped out at a loading site (by a plurality of tipping-out processes carried out in succession), the predetermined loading mass m_zul or the predetermined residual mass m_re.

At least one, in particular all, of the following quantities are signaled:
- the current mass m_akt of the cargo load contained in the reception unit,
- a current total mass m_sum_akt of the amount of cargo load already tipped out at a loading site (by immediately preceding tipping-out processes),
- a target total mass m_sum_ziel of the cargo load to be tipped out at a loading site (by a plurality of tipping-out processes carried out chronologically in succession),
- a difference Δm_sum, m_zul between the target total mass m_sum_ziel and the current total mass m_sum_akt,
- a number n_KV of tipping-out processes already carried out, wherein this number n_KV corresponds to a current total mass m_sum_akt of the cargo load already tipped out at a loading site,
- a specific feature spez_L of the cargo load, for example, the nature, type or material of the cargo load.

The work machine is, in particular, configured as a utility vehicle. Tractors, haulers, construction machines, wheeled loaders, diggers, backhoes, telescopic handlers, tipping drones may be envisaged as utility vehicles.

Depending on the type or the functionality of the respective work machine, the lifting device may comprise a single, inherently rigid boom part between the work machine and the reception unit, or alternatively a plurality of boom parts which are connected to one another in a mobile fashion.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
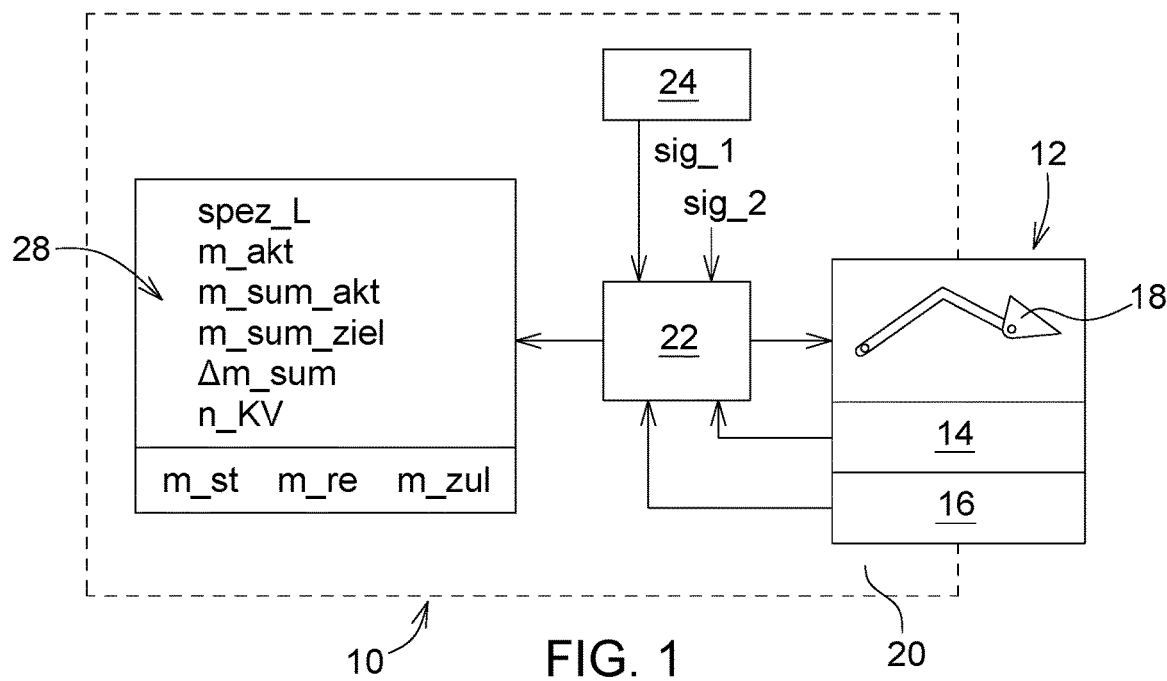
FIG. 1 shows a schematic block-diagrammatic representation of a work machine having a control unit for carrying out the method.

FIG. 1 schematically shows individual components of a work machine 10 in the form of a tractor or hauler having a lifting device 12 in the form of a front loader arranged thereon. The work machine 10 comprises a suitable sensor unit 14 and a weighing device 16. The weighing device 16 can weigh a cargo load L contained in a reception unit 18 configured as a scoop.

The sensor unit 14 comprises by way of example various acceleration sensors and pressure sensors, which may be arranged on the lifting device 12 or on a carrier structure 20 of the work machine 10. The sensor unit 14 may, for example, be configured in the manner of the sensor instrument according to DE 10 2013 203 826 A1. In one embodiment, the weighing device 16 may likewise be configured and functionally effective in the manner of the weighing device according to DE 10 2013 203 826 A1.

Signals, or data, of the sensor unit 14 and of the weighing device 16 are sent to an electronic control unit 22 of the work machine 10. In another embodiment, which is not represented here, the weighing device 16 is a component of the control unit 22. The control unit 22 controls the lifting device 12 or its reception unit 18 in order to make it possible to tip out the cargo load L from the reception unit 18, in the manner yet to be described.

An input unit 24 is connected to the control unit 22. This input unit is, for example, configured as a keypad or display and is used for the entry (for example, manual, by voice, etc.) of data by a user or driver of the work machine 10. The input unit 24 sends the entered data as signals sig_1 to the control unit 22. The control unit 22 may furthermore receive signals sig_2. These signals sig_2 represent data of an information system (for example, CAN bus, CANFD bus, Ethernet, EtherCAT, LIN bus, FlexRay bus, IIC, DART) of the work machine 10 and optionally further data, which are available independently of individual data entries by the user or driver of the work machine 10.

For example, by the signals sig_1 or sig_2, the control unit 22 receives information about the nature of the cargo load L (for example, soil, grit, specific liquid, etc.) or about a target total mass m_sum_ziel of the cargo load L, which is intended to be tipped out at a loading site 26. The target total mass m_sum_ziel may also be dependent on a maximum permissible loading, which is communicated to the control unit 22 by the signals sig_1 or sig_2.

The control unit 22 furthermore outputs data to a display unit 28. By the display unit 28, the user or driver of the work machine 10 may be informed about the progress of the loading activity at the loading site 26. For example, the display unit 28 signals the following information:
- a specific distinguishing feature spez_L between different cargo loads L, for example, the nature, type or material of the cargo load L,
- a current mass m_akt of the cargo load L currently contained in the reception unit 18,
- a current total mass m_sum_akt of the cargo load L already tipped out at the loading site 26,
- the target total mass m_sum_ziel of the cargo load L to be tipped out at the loading site 26,
- a difference Δm_sum between the target total mass m sum ziel and the current total mass m_sum_akt, and
- a number n_KV of tipping-out processes already carried out, this number n_KV representing the current total mass m_sum_akt of the cargo load L already tipped out at the loading site 26

Figure 2:
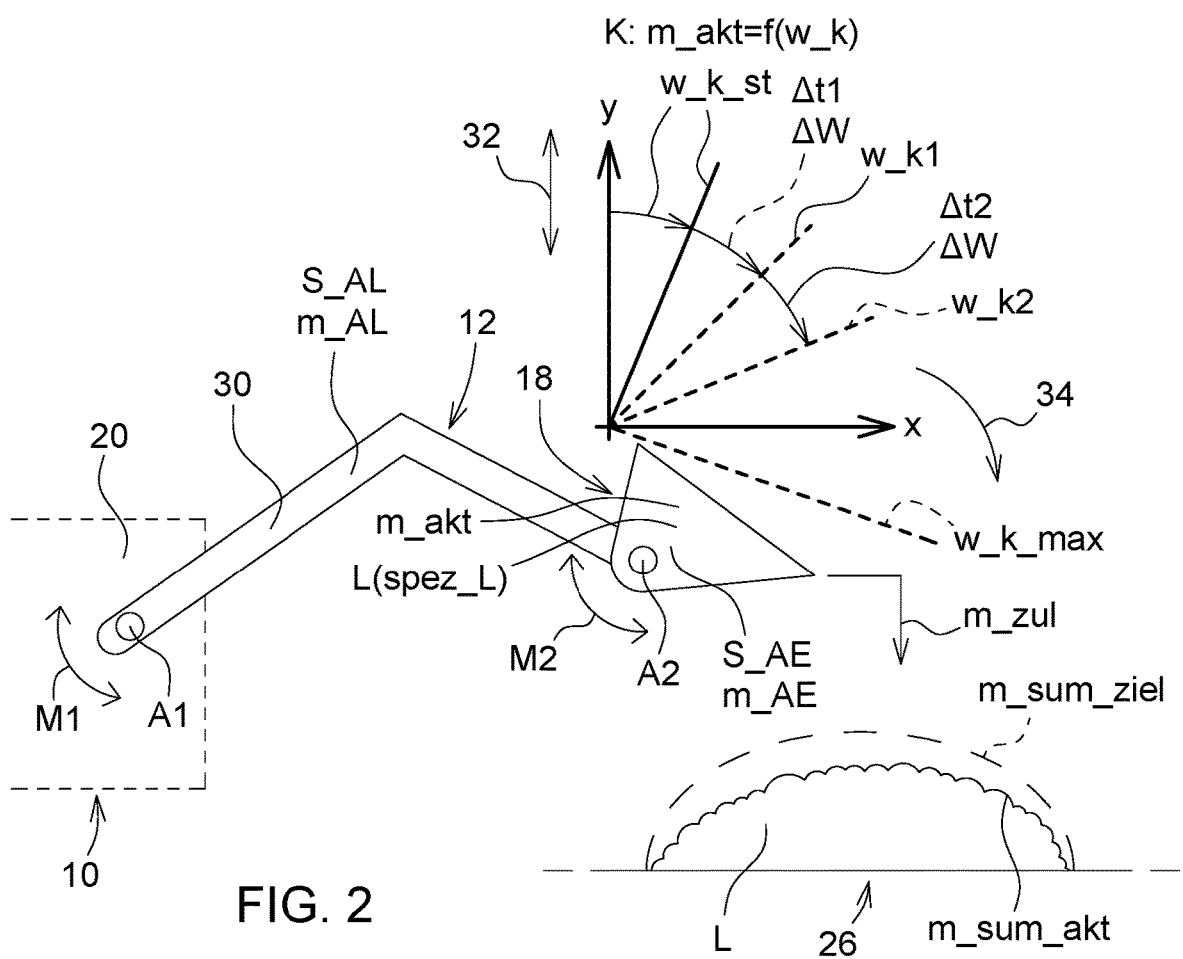
FIG. 2 shows a schematic representation of the lifting device.

In FIG. 2, at the loading site 26 the current total mass m_sum_akt is indicated schematically by a solid line, whereas the target total mass m_sum_ziel is represented by a dashed line.

If the loading activity at the loading site 26 requires a plurality of tipping-out processes in succession for the same cargo load, the difference Δm_sum for the final tipping-out process corresponds to a loading mass m_zul be determined by precisely this difference. This predetermined loading mass m_zul of the cargo load L should be tipped out as accurately as possible during the final tipping-out process, in order to avoid exceeding the target total mass m_sum_ziel at the loading site 26. Similar considerations apply when only a single tipping-out process is required. In that case, this single tipping-out process is at the same time also the final tipping-out process.

In one embodiment of the display unit 28, the aforementioned loading mass m_zul, an initial mass m_st (yet to be described) in the reception unit 18 and a residual mass m_re (likewise yet to be described) in the reception unit 18 may also be signaled.

Irrespective of the input unit 24 and display unit 28 being represented separately in FIG. 1, in another embodiment these two units may be combined in a single device.

FIG. 2 schematically shows the lifting device 12 arranged on the work machine 10. This lifting device comprises a boom 30, which is mounted tiltably about a first tilt axis A1 relative to the work machine 10. The reception unit 18 is mounted tiltably about a second tilt axis A2 relative to the boom 30.

Various physical features of the boom 30 and of the reception unit 18 may be used in order to determine a mass of the cargo load L in the reception unit 18. The initial mass m_st, or the current mass m_akt, may for example, be determined by the sensor unit 14 and provided algorithms (for example, based on DE 10 2013 203 826 A1) as a function of the following quantities:

a mass m_AL of the boom 30 and its centroid S_AL with respect to the first tilt axis A1,
a mass m_AE of the reception unit 18 and its centroid S_AE with respect to the second tilt axis A2,
a torque M1 about the first tilt axis A1, and
a torque m2 about the second tilt axis A2.

The movable tilting bearing of the reception unit 18 about the tilt axis A2 allows different tipping angles w_k of the reception unit 18 relative to a vertical 32, which acts as a reference straight line for varying tipping angles w_k. The reference straight line corresponds to the y-axis of the indicated x/y coordinate system. Other reference straight lines may be envisaged, for example,a horizontal, which would correspond to the x-axis of the aforementioned coordinate system.

During a tipping-out process, the tipping angle w_k changes in a tipping-out direction 34 and therefore becomes greater stepwise. The tipping angle w_k is in this case readjusted stepwise after a defined time interval has elapsed, as represented by way of example with the aid of the time intervals Δt1 and Δt2, the angle changes Aw as well as the modified tipping angles w_k1 and w_k2 in the x/y coordinate system. At the start of the tipping-out process, the tipping angle w_k is adjusted in a defined way as an initial angle w_k_st relative to the reference straight line used (here: vertical y-axis). This adjustment may be carried out automatically by the control unit 22 using registered data. Starting from the initial angle w_k_st, a maximum angle variation is also defined, in order to initiate automated termination of the tipping-out process. The selected reference straight line in FIG. 2 is a maximum tipping angle w_k_max, the detected reaching or exceeding of which initiates termination of the tipping-out process. At the maximum tipping angle w_k_max, the reception unit 18 is opened far down in the direction of the loading site 26. Nevertheless, the maximum tipping angle w_k_max is adjusted in particular in such a way that there is still a latitude for movement between it and the mechanical endstop of the reception unit 18.

In one embodiment of the present disclosure, the control unit 22 accesses stored calibration data which represent a ratio between a mass of the cargo load L in the reception unit 18 and a corresponding tipping angle w_k of the reception unit 18. In particular, the stored calibration data are the current mass m_akt of a specific cargo load L in the reception unit 18 as a function of the tipping angle w_k, i.e. m_akt=f(w_k). The calibration data are stored as a characteristic curve K or a table. For different cargo loads L with different specific features spez_L, different characteristic curves K or tables are usually provided.

The calibration data may be stored in the control unit 22 of the work machine or, for example, communicated to the control unit by means of the input sig_2.

The control unit 22 is configured in such a way that it receives and sends all the data, signals, etc. which are required for carrying out a tipping-out process. In particular, the control unit 22 controls the lifting device 12 and its reception unit 18. To this end, for example, hydraulic cylinders on the lifting device 12 are operated.

Figure 3:
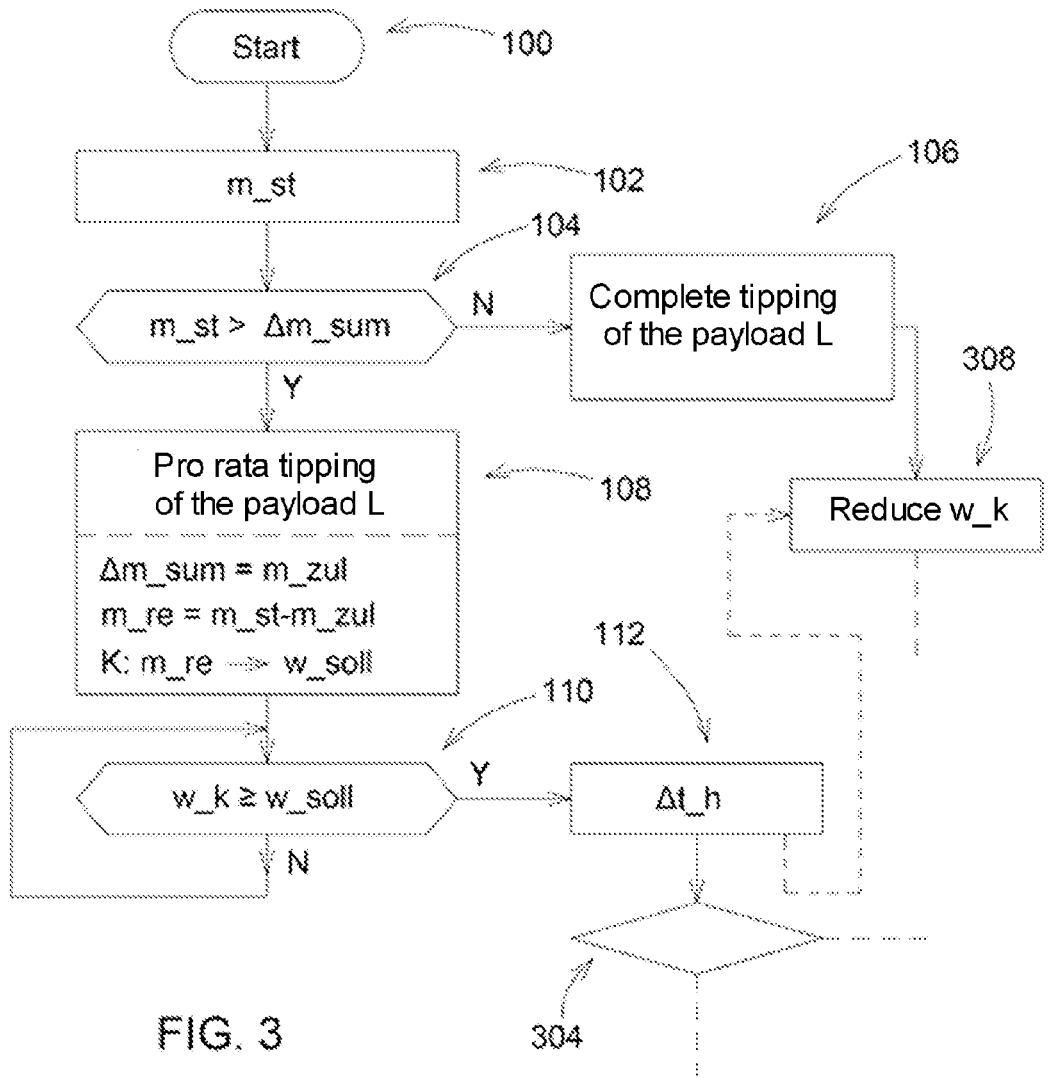
FIG. 3 shows a flowchart of the method in a first embodiment.

FIG. 3 shows the procedure of a tipping-out process in a first embodiment. After the initial step 100, in step 102 the current mass m_akt of the cargo load L in the reception unit 18 is determined. This mass of the cargo load L corresponds to its initial mass m_st immediately before the start of the tipping-out. In step 104, the initial mass m_st is compared with the difference Δm_sum between the target total mass m_sum_ziel and the current total mass m_sum_akt. If the initial mass m_st is not greater than the difference Δm_sum, the cargo load L may be tipped out fully from the reception unit 18 during the current tipping-out process (step 106). Further method steps may subsequently be carried out, i.e., in particular a step 308 and a step 306 according to FIG. 5, in order to move the tipping angle w_k in the direction of the initial angle w_k_st and end the tipping-out process.

If the initial mass m_st is greater than the difference Δm_sum, the cargo load L should be tipped out only portionally, i.e., as accurately as possible to the extent of the mass corresponding to this difference Δm_sum. The loading mass m_zul to be tipped out during this tipping-out process is therefore predetermined as the difference Δm_sum (step 108). This tipping-out process is the final tipping-out process of a loading activity, during which in contrast to the preceding tipping-out processes with full tipping out, only partial tipping out of the cargo load L on the reception unit 18 is intended to take place in order to reach the target total mass at the loading site 26 as accurately as possible.

Likewise in step 108, the residual mass m_re to remain in the reception unit 18 is predetermined by the equation m_re=m_st−m_zul. The setpoint value w soll of the tipping angle w_k, which corresponds to the residual mass m_re in the reception unit 18, may be predetermined from the stored calibration data, or the characteristic curve K (step 108).

By means of the control unit 22, the tipping angle w_k of the reception unit 18 is adjusted until the predetermined setpoint value w soll is reached or exceeded (step 110). Once the reaching or exceeding of the setpoint value w_soll is established, or detected, this corresponds to indirect detection of the predetermined residual mass m_re.

After a defined holding time Δt_h for the adjusted setpoint value w soll has elapsed (step 112), in one method variant the tipping angle w_k may be returned in the direction of the initial angle w_k_st in order to end the tipping-out process. This variant is indicated after step 112 as a dashed arrow in the direction of step 308.

Figure 5:
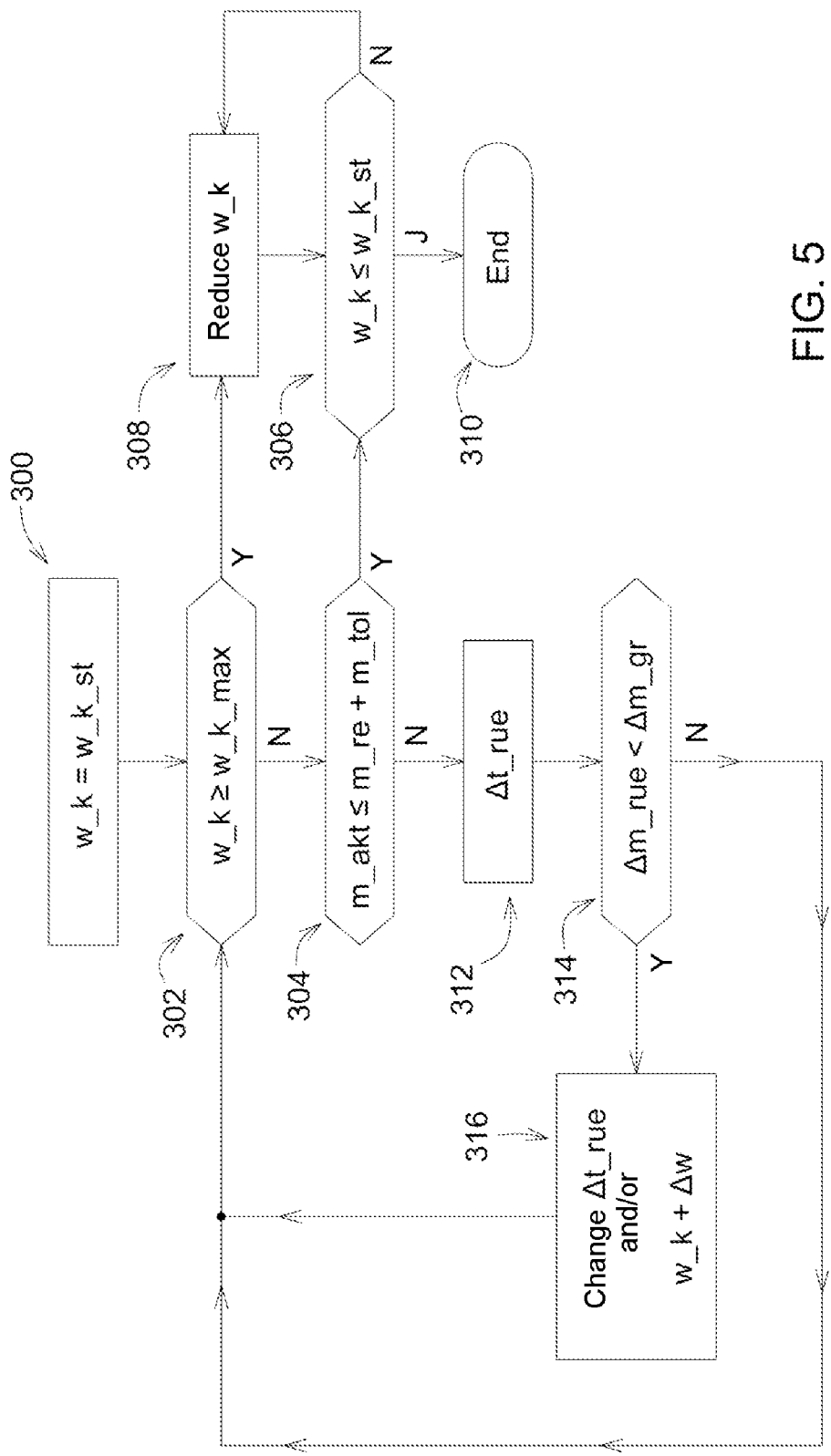
FIG. 5 shows a flowchart with further method steps for use in the method sequences according to FIG. 3 and FIG. 4.

In an alternative method variant, after the holding time Δt_h has elapsed, a check is made in a step 304 according to FIG. 5 as to whether the predetermined residual mass m_re, optionally with a tolerance taken into account in the form of a tolerance mass m_tol (for example, 20 kg), in the reception unit 18 has actually been reached or fallen below. If so, the tipping angle w_k is returned in the direction of the initial angle w_k_st and the tipping-out process is ended (steps 306, 308, 310).

If the predetermined residual mass m_re, including a tolerance to be taken into account, in the reception unit 18 has not yet been reached during step 304, a shaking process is carried out in step 312 for a defined shaking duration Δt_rue. In this case, the reception unit 18 is moved once or several times—depending on the shaking duration Δt_rue— counter to the tipping-out direction 34 and in the tipping-out direction 38 in order to tip out further mass of the cargo load L from the reception unit 18. In a subsequent step 314, the shaking mass Δm_rue tipped out by means of the shaking process is compared with a defined mass limit value Δm_gr.

If it is established in step 314 that the shaking mass Δm_rue has reached or exceeded the mass limit value Δm_gr, by carrying out steps 302 and 304 a check may again be made as to whether more mass of the cargo load L should be tipped out from the reception unit 18 or whether the tipping-out process may be ended (steps 306, 308, 310). If, in step 314, the shaking mass Δm_rue has fallen below the mass limit value Δm_gr, in step 316 further measures are implemented, namely the shaking duration Δt_rue is modified or the tipping angle w_k is increased. Which measure is carried out with which physical parameters may be dependent on the determined distance between the two values shaking mass Δm_rue and mass limit value Δm_gr. Subsequently, if the maximum tipping angle w_k_max has not yet been reached, steps 302 and 304 are carried out again. A check is therefore again made as to whether more mass of the cargo load L should be tipped out from the reception unit 18 or whether the tipping-out process may be ended (steps 306, 308, 310).

Particularly in the case of a cargo load L having complex properties (for example, adhesive, viscous) with a not exactly repeatable tipping-out behavior, in order to increase the accuracy of the tipping-out process it may be advantageous to detect the reaching of the predetermined residual mass m_re, or the tipping-out of the predetermined loading mass m_zul having been carried out, not indirectly, as described with the aid of steps 108, 110 according to FIG. 3.

Rather, as an alternative to the procedure according to FIG. 3, calibration data or characteristic curves K may be obviated. The reaching of the predetermined residual mass m_re, or the tipping-out of the predetermined loading mass m_zul having been carried out, during a tipping-out process is detected directly by determining the current mass m_akt of the cargo load L contained in the reception unit 18 during this tipping-out process. The current mass m_akt is determined several times during the tipping-out process, in particular continuously after determined time intervals have elapsed. In this case, for example, the time intervals Δt1 and Δt2 for the stepwise adjustment of the tipping angle w_k may be used.

Figure 4:
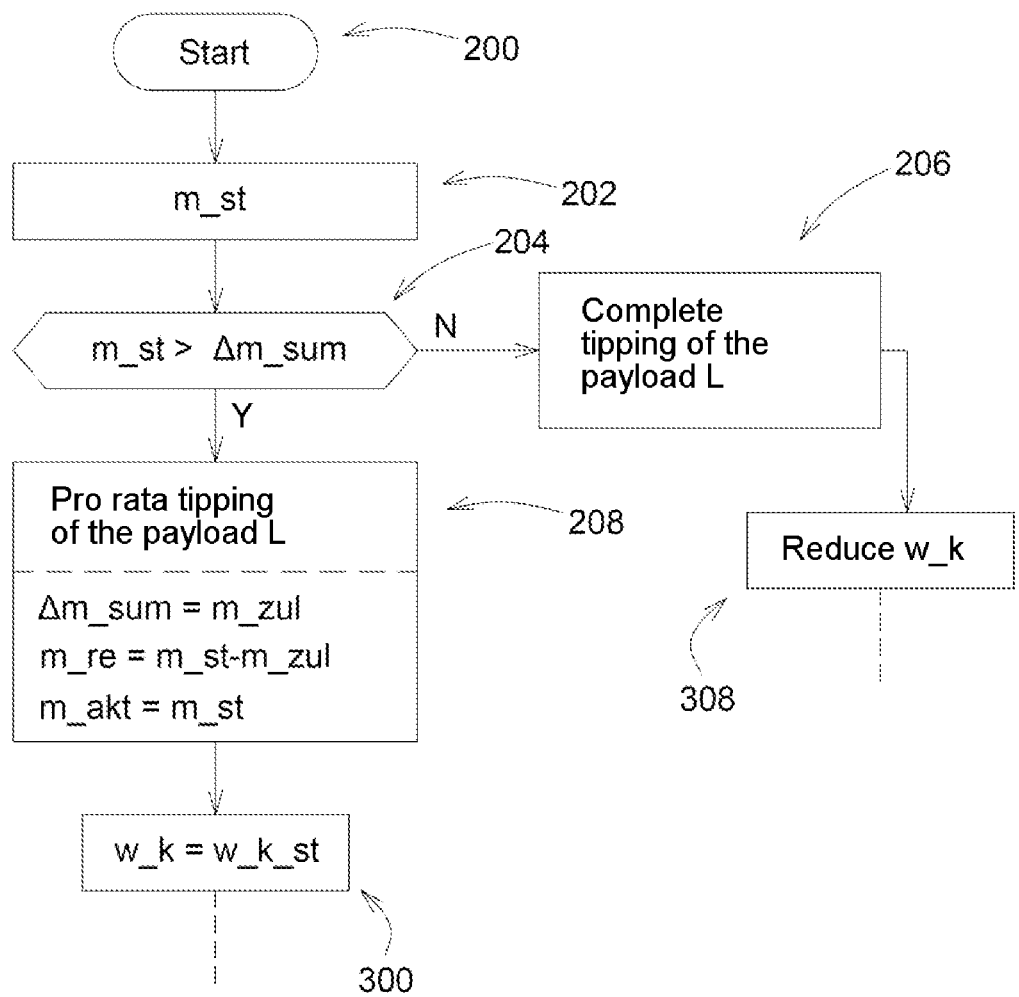
FIG. 4 shows a flowchart of the method in a further embodiment.

FIG. 4 represents the procedure of a tipping-out process, during which the reaching of the predetermined residual mass m_re is detected directly, i.e., without calibration data or characteristic curves K. After the start step 200, in step 202 the current mass m_akt of the cargo load L in the reception unit 18 is determined. This mass of the cargo load L corresponds to its initial mass m_st immediately before the start of the tipping-out. In step 204, the initial mass m_st is compared with the difference Δm_sum between the target total mass m_sum_ziel and the current total mass m_sum_akt. If the initial mass m_st is not greater than the difference Δm_sum, the cargo load L may be tipped out fully from the reception unit 18 during the current tipping-out process (step 206). Further method steps may subsequently be carried out such as the steps 308 and 306 according to FIG. 5 in order to move the tipping angle w_k in the direction of the initial angle w_k_st and end the tipping-out process.

If the initial mass m_st is greater than the difference Δm_sum, the cargo load L should be tipped out only partially, i.e., as accurately as possible to the extent of the mass corresponding to this difference Δm_sum. The loading mass m_zul to be tipped out during this tipping-out process is therefore predetermined as the difference Δm_sum (step 208). This tipping-out process is the final tipping-out process of a loading activity, during which, in contrast to the preceding tipping-out processes with full tipping out, only partial tipping out of the cargo load L from the reception unit 18 is intended to take place in order to reach the target total mass at the loading site 26 as accurately as possible.

Likewise in step 208, the residual mass m_re to remain in the reception unit 18 is predetermined by the equation m_re=m_st−m_zul.

Immediately before the tipping-out, the determined current mass m_akt in the reception unit 18 corresponds to the initial mass m_st (steps 202, 208).

Except for a predetermination of the loading mass m_zul to be tipped out or a predetermination of the residual mass m_re to remain in the reception unit 18, the method procedure in the embodiment according to FIG. 4 is in principle the same as in the variant according to FIG. 3. In the method according to FIG. 4, however, a predetermined setpoint value w_soll of the tipping angle w_k is not approached. Rather, the tipping angle w_k of the reception unit 18 is initially adjusted to the defined initial angle w_k_st (step 300). Starting therefrom, the current tipping angle w_k is increased stepwise and as a function of the already explained steps 302, 304, 312, 314, 316 which have been carried out. In this case the respective current tipping angle w_k of the reception unit 18 is modified in the tipping-out direction 34 (step 316), so that a further portion of the cargo load L can be tipped out from the reception unit 18. With the selected reference straight line (vertical) and the x/y coordinate system used, according to FIG. 2, this means that the current tipping angle w_k is increased by a defined angle magnitude Δw and then, for example, is equal to w_k1 or w_k2. With a differently selected reference system, the method step at this point may require a reduction of the current tipping angle w_k by a defined angle magnitude Δw.

Because of the steps 304, 312, 314, 316, the current mass m_akt in the reception unit 18 determined continuously during the tipping out (for example, after a respective time interval Δt1, Δt2 has elapsed), becomes smaller and smaller until it is established in step 304 that the current mass m_akt is less than or equal to the predetermined residual mass m_re, including the tolerance mass m_tol. The tipping-out process should then be ended. To this end, in step 308 the reception unit 18 is tilted counter to the tipping-out direction 34. If an increase of the current tipping angle w_k was carried out in 316, this means that in step 308 the last current tipping angle w_k is reduced by a defined angle magnitude Δw. The angle magnitudes Δw in steps 316 and 308 may be identical or different.

Regardless of whether the tipping-out process is carried out according to FIG. 3, FIG. 4 or a different embodiment, smooth flow of the cargo load L out of the reception unit 18 may be assisted by carrying out at least one shaking process during the tipping out, during which process the reception unit 18 is tilted at least once counter to the tipping-out direction 34 and subsequently in the tipping-out direction 34 again.

It should be pointed out individual details of the features represented in the drawings are at least sometimes not to scale.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for tipping a cargo load from a reception unit, comprising:
   determining via a weighing device connected to a sensor system and a control unit an initial mass of the cargo load in the reception unit;
   registering via the control unit a total target quantity representing a total cargo load to be tipped out at a loading station;
   registering via the control unit a current total quantity representing the cargo load already tipped out at the loading station;
   determining via the control unit to partially tip out the cargo load if the initial mass is greater than a first difference between the total target quantity and the current total quantity;
   determining via the control unit a residual mass of the cargo load to remain in the reception unit based on a second difference between the initial mass and the first difference;
   determining via the control unit a setpoint value of a tipping angle of the reception unit corresponding to the residual mass based on stored calibration data including specific nature, particle geometries, temperature, and moisture content of the cargo load and a holding time of the tipping angle;
   tipping via the control unit the reception unit to the setpoint value of the tipping angle for a defined holding time so that the residual mass remains in the reception unit;
   determining via the weighing device a current mass of the cargo load in the reception unit;
   shaking via the control unit the reception unit for a defined shaking duration when the current mass is greater than a sum of the residual mass and a tolerance mass;
   modifying via the control unit at least one of the defined shaking duration and the tipping angle based on a third difference between the shaking mass and a defined mass limit value when the shaking mass is less than the defined mass limit value; and
   determining via the control unit whether the current mass is less than or equal to the sum of the residual mass and the tolerance mass when the tipping angle is less than a defined maximum tipping angle, which is less than a mechanical end-stop of the reception unit.

2. The method of claim 1, wherein the control unit modifies the defined shaking duration and increases the tipping angle based on the third difference between the shaking mass and the defined mass limit value when the shaking mass is less than the defined mass limit value.

3. The method of claim 1, further comprising:
   reducing the tipping angle to a defined initial angle when tipping angle is greater than or equal to the defined maximum tipping angle.

4. The method of claim 1, further comprising:
   reducing the tipping angle to a defined initial angle when the current mass is less than or equal to the sum of the residual mass and the tolerance mass.

5. A method for tipping a cargo load from a reception unit, comprising:
   determining via a weighing device connected to a sensor system and a control unit an initial mass of the cargo load in the reception unit;
   registering via the control unit a total target quantity representing a total cargo load to be tipped out at a loading station;
   registering via the control unit a current total quantity representing the cargo load already tipped out at the loading station;
   determining via the control unit to partially tip out the cargo load if the initial mass is greater than a first difference between the total target quantity and the current total quantity;
   determining via the control unit a residual mass of the cargo load to remain in the reception unit based on a second difference between the initial mass and the first difference;
   adjusting via the control unit a tipping angle of the reception unit to a defined initial angle;
   determining via the weighing device a current mass of the cargo load in the reception unit when the tipping angle is less than a defined maximum tipping angle, which is less than a mechanical end-stop of the reception unit;
   shaking via the control unit the reception unit for a defined shaking duration when the current mass is greater than a sum of the residual mass and a tolerance mass;
   modifying via the control unit at least one of the defined shaking duration and the tipping angle based on a third difference between the shaking mass and a defined mass limit value when the shaking mass is less than the defined mass limit value; and
   determining via the control unit whether the current mass is less than or equal to the sum of the residual mass and the tolerance mass when the tipping angle is less than the defined maximum tipping angle.

6. The method of claim 5, wherein the control unit modifies the defined shaking duration and increases the tipping angle based on the third difference between the shaking mass and the defined mass limit value when the shaking mass is less than the defined mass limit value.

7. The method of claim 5, further comprising:
   reducing the tipping angle to the defined initial angle when tipping angle is greater than or equal to the defined maximum tipping angle.

8. The method of claim 5, further comprising:
   reducing the tipping angle to the defined initial angle when the current mass is less than or equal to the sum of the residual mass and the tolerance mass.

* * * * *